United States Patent [19]

Yamada et al.

[11] 4,403,344
[45] Sep. 6, 1983

[54] RECEIVER HAVING PROGRAM RESERVING FUNCTION

[75] Inventors: Shigeru Yamada; Kazuo Watanabe; Mitsuo Aramaki, all of Toda, Japan

[73] Assignee: Clarion Co., Ltd., Tokyo, Japan

[21] Appl. No.: 274,925

[22] Filed: Jun. 18, 1981

[30] Foreign Application Priority Data

Jun. 18, 1980 [JP] Japan .................................. 55-81396

[51] Int. Cl.³ .............................................. H04B 1/16
[52] U.S. Cl. .................................... 455/181; 455/186; 455/231
[58] Field of Search ............... 455/171, 181, 186, 231; 358/192.1; 369/19, 20, 6, 7

[56] References Cited

U.S. PATENT DOCUMENTS

| 3,800,230 | 3/1974 | Marks et al. | 455/181 |
| 4,031,470 | 6/1977 | Kokado et al. | 455/181 |
| 4,162,513 | 7/1979 | Beyers, Jr. et al. | 358/192.1 |
| 4,315,332 | 2/1982 | Sakami et al. | 455/181 |

Primary Examiner—Jin F. Ng
Attorney, Agent, or Firm—Flynn, Thiel, Boutell & Tanis

[57] ABSTRACT

A receiver has a program reserving function in which a reserved time previously stored in a program reserving memory is continuously compared with outputs produced by a clock circuit in response to actual time, and accordingly when the actual time coincides with the reserved time, the receiver automatically receives a wave corresponding to a preset number previously stored in the program reserving memory together with the reserved time. The receiver is characterized particularly in that there are further provided a program button for allowing the time adjusting buttons to serve as program input buttons and a memory button for causing the memory to store the data put in by the time adjusting buttons. With this arrangement, the time adjusting buttons are switched to be reserved data input buttons by means of the program button and returned to be buttons for adjusting time means of by the memory button.

1 Claim, 3 Drawing Figures

RECEIVER HAVING PROGRAM RESERVING FUNCTION

BACKGROUND OF THE INVENTION

1. Field of the Invention

The present invention relates to a receiver having a program reserving function, and more specifically to improvements in a reserved data input system.

2. Description of the Prior Art

In a conventional program reserving function applied in a receiver of a car radio, etc., there have been used a driving computer and an audio timer for home use, for example. However, the data input system by them makes the operation of the receiver complicated, and at the same time, a lot of operating buttons have to be provided.

That is, in such a conventional system, it is necessary to accommodate at least ten numerical buttons each having one of the numbers from 1 to 10. Therefore, a user has to search for a desired button among a lot of buttons including other buttons during operation. Particularly, in a receiver in which preset buttons and numerical buttons both are used, it is not possible to use a tuner of 5/10 type, whereby a respectively large space is required. On the other hand, it is generally desired to put together operating sections of a car radio and a cassette deck to thereby increase additional functions of the device and, accordingly, there is a tendency to limit the space for mounting the car radio.

OBJECTS OF THE INVENTION

It is therefore an object of the invention to make it possible to use means for hour adjustment, minute adjustment and time adjustment as data input means by operating a program switching means as well as to cancel the data input function by operating a memory switching means.

SUMMARY OF THE INVENTION

In accordance with the invention, there is provided a receiver having a program reserving function which includes a memory for memorizing a reserved time and a corresponding reserved program number, a clock circuit, a comparator and a radio receiver of a synthesizer type, said comparator being arranged to carry out comparison between the reserved time from said memory and an actual time from said clock circuit to control said receiver so as to receive a radio wave of the program corresponding to the reserved time and number when the reserved time and the actual time coincide, an improvement therein including:
- a time adjusting means for adjusting time signals put out from said clock circuit;
- a program reserving means; and
- a setting means for setting a reserved time and a corresponding reserved program number in said memory by means of the outputs from said time adjusting means in response to the operation of said program reserving means.

DETAILED DESCRIPTION OF THE PREFERRED EMBODIMENTS

The invention will now be described in detail referring to the preferred embodiments as shown in the accompanying drawings.

Figure 1:
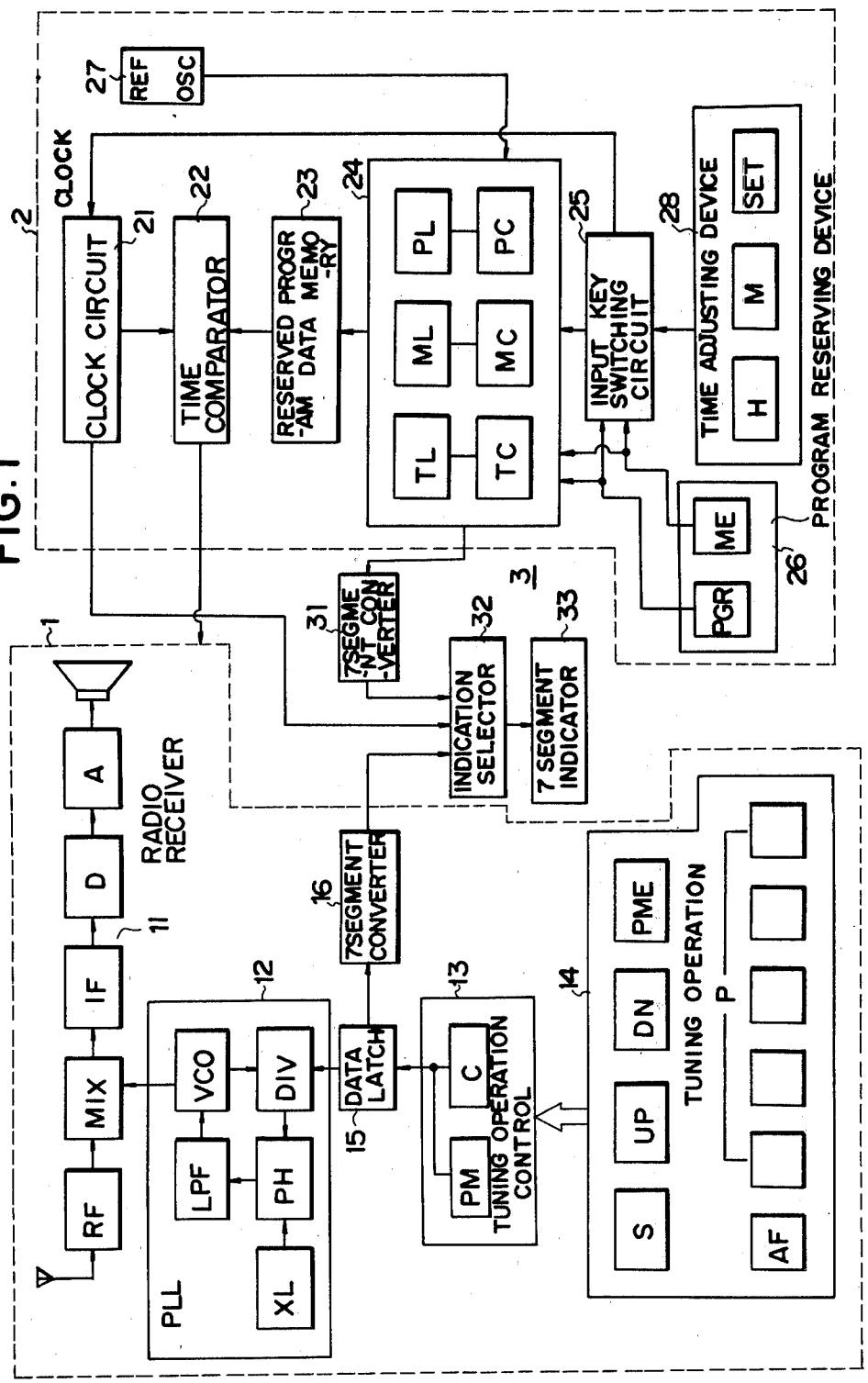
FIG. 1 is a block diagram illustrating an embodiment according to the invention.

FIG. 1 illustrates an embodiment according to the invention of an AM/FM car radio of a PLL synthesizer type having a program reserving function. In FIG. 1, the reference numeral 1 designates a radio section, 2 a clock section and 3 a display section, respectively. The radio section 1 comprises a radio receiver 11, a PLL circuit 12, a tuning operation control circuit 13, a tuning operation device 14, a data latch circuit 15 and a circuit 16 for received frequency conversion and for 7 segment conversion.

The radio receiver 11 includes a high frequency amplifier RF, a mixing circuit MIX, an intermediate frequency amplifier IF, a wave detector D and a voice amplifier A. The PLL circuit 12 has a reference oscillator XL, a voltage control oscillator VCO, a low pass filter LPF, a phase comparator PH and a programmable divider DIV.

The tuning operation control circuit 13 comprises a preset memory circuit PM and an up/down counter C. The tuning operation device 14 has various tuning operation buttons such as preset memories P, an AM/FM switching button AF, a scanning button S, up/down switching buttons UP and DN, a preset memory button PME, etc.

The clock section 2 comprises a clock circuit 21 having a 7 segment converting function, a time comparator 22, a reserved program data memory 23, a latch and counter circuit 24, an input key switching circuit 25, a program reserving device 26, a reference oscillator 27 for producing a clock signal and a time adjusting device 28.

The latch and counter circuit 24 has an hour data latch circuit TL, a minute data latch circuit ML and a preset number latch circuit PL. The latch and counter circuit 24 also has an hour counter TC, a minute counter MC, and a preset number counter PC which are all supplied with clock pulses from the oscillator 27 under the control of the input key switching circuit 25. Thus, each output of those counters are latched in the corresponding latch circuit. The program reserving device 26 has a program button PGR and a memory button ME. The time adjusting device 28 includes an hour adjustment button H, a minute adjustment button M and a time setting button SET.

Further, the display section 3 comprises a 7 segment converter 31, an indication selector 32 and a 7 segment indicator 33. The indication selector 32 alternatively applies signals corresponding to the frequency of the tuned wave in the radio section 1 (output of the latch circuit 15), the actual time (output of the clock circuit 21) and the time to be reserved (outputs of the latch circuits of the latch and counter circuit 24) to the display unit 33.

Figure 2:
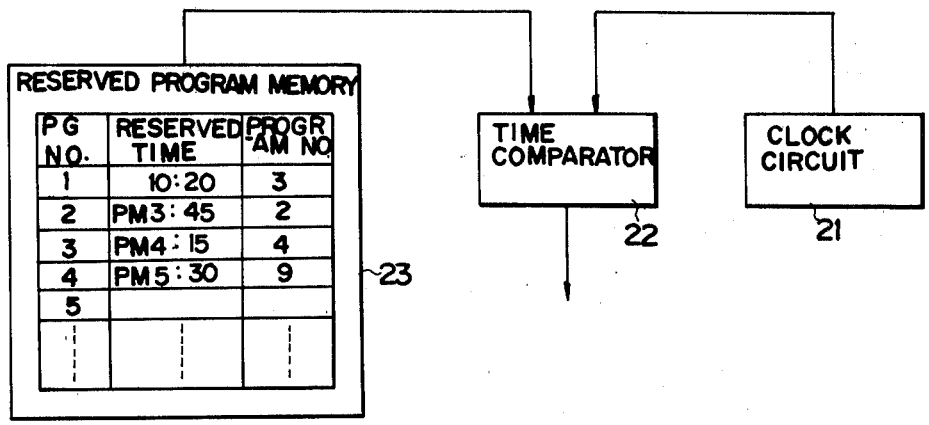
FIG. 2 and FIG. 3 are explanation diagrams of the program reserving feature.

Incidentally, the structure, operation, handling manner, etc. of the radio section 1 are well-known and are not described herein. A program reserving function means a function, as shown in FIG. 2, such that the reserved program data memory 23 is arranged to previously store the time of a reserved program and its preset number. Thereafter, the time comparator 22 continuously compares the data in the above memory 23 and the output from the time comparator 22 which corresponds to the actual time, whereby when both coincide, the radio wave frequency previously stored in the memory 23 as the preset number together with the reserved time can be automatically received.

Particularly in the present invention, in order to impove a program reservation operating manner in a receiver having such a program reserving function, time adjusting buttons H, M and SET are enabled to serve also as reserved program data input buttons by means of the program button PGR, the memory button ME and the switching circuit 25.

When the program button PGR is pushed, the data in the reserved program data memory 23 is read out to the time comparator 22, whereby the radio wave previously reserved as mentioned above is received. When the program button PGR is kept pushed, the number previously stored in the reserved program data memory is renovated and the renovated number is read out. Further, the input key switching circuit 25 is actuated to change the time adjusting buttons H, M and SET so as to serve as reserved program data input buttons.

If the hour adjusting button H is kept pushed during time adjustment when the program button is not pushed, the switching circuit 25 controls the clock circuit 21 in response to the above condition so as to increase the numerical value of the hour of the indicator 33 one by one at a predetermined interval. Accordingly, if the indicator 33 is arranged to indicate 12 hours, for example, it counts up in a manner of $00_{PM}$ ... $11_{PM} \rightarrow 00 \rightarrow$ in accordance with the increase from 00 to 11. Consequently, if the button is released, the indicator 33 keeps indicating a numerical value of the hour at the time of the release.

In the same manner, if the minute adjusting button M is kept pushed, the numerical value of the minute of the indicator 33 increases one by one at a predetermined interval. That is, the indicator repeatedly counts up 0 to 59, and on the other hand, if the button is released, the indicator 33 keeps indicating the numerical value of minute at the time of the release.

The time setting button SET is arranged to clear the value of the minute and second of the indicator 33 when it is pushed before a predetermined time, 30 minutes, for example. That is, the numerical value 11:15, for example, is cleared to be 11:00. On the other hand, if the button is pushed after such predetermined time, the indicator 33 is simultaneously made not only to advance the hour indication by one hour but also to clear the minute and second indication. For example, the indication of PM 3:45 is changed to be PM 4:00.

Thus, the time adjusting buttons H, M and SET are arranged to have hour adjusting, minute adjusting and correct time adjusting functions, respectively, during the released condition of the program button PGR, while they serve as preset input buttons for adjusting the hour and minute of a reserved program and for counting up these values during the pushed condition of the program button PGR.

That is, when the program button is pushed, the switching circuit 25 accordingly makes each of the counters TC, MC and PC count up clock pulses from the oscillator 27 when the time adjusting buttons H, M and SET are respectively pushed.

Further, the memory button ME, when pushed, causes the switching circuit 25 to correspondingly make the reserved program data memory 23 store data latched in the latch circuits TL, ML, PC of the latch counter circuit 24 by the time adjusting buttons H, M and SET, and simultaneously, causes the input key switching circuit 25 to return the time adjusting buttons to their time adjusting condition.

Figure 3:
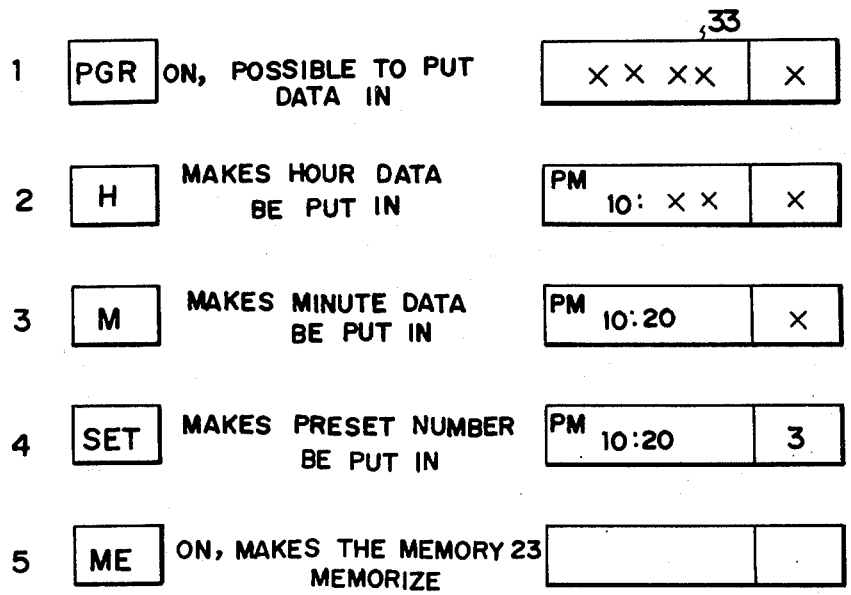

In FIG. 3, there is illustrated an example of a reserved program data input sequence according to the invention.

As described above, according to the invention, the prescribed object can be attained solely by adding two buttons, a program button and a memory button, and thus the increase of buttons is maintained as small as possible. Additionally, the number of the buttons to be operated during input is as few as 5 at maximum. Further, since the time adjusting buttons are arranged only to count up values for input data, its operating manner in both conditions is similar and thus can be easily understood.

Incidentally, one of the preset memory buttons P of the tuning operation device 14 can be arranged to be changeable in its mode by means of the program button PGR so as to serve as a memory button for program reservation. Thus, the increase of the buttons can be held to only one.

We claim:

1. A receiver having a program reserving function, comprising a memory for storing a reserved time and a corresponding reserved program number, a clock circuit, a comparator and a synthesizer-type radio receiver, said comparator comparing the reserved time in said memory to the actual time in said clock circuit and causing said receiver to receive radio waves of the program corresponding to the reserved time and number when the reserved time and the actual time coincide, said receiver further including time adjusting means for adjusting the time in said clock circuit, program reserving means, and setting means for causing a reserved time and a corresponding reserved program number defined by the outputs of said time adjusting means to be stored in said memory in response to operation of said program reserving means, said time adjusting means including first, second and third time adjusting buttons and said program reserving means including a program button and a memory button, said first, second and third time adjusting buttons being adapted to respectively adjust hours, minutes and seconds in said clock circuit, said setting means including reference clock signal generating means, a latch, counter means and input key switching means, said input key switching means being responsive to the operation of said program button for causing said counter means, under the control of said time adjusting buttons, to count the clock signals from said reference clock signal generating means and for causing said latch to latch the output of said counter means, said counter means output in said latch being stored in said memory by said setting means in response to operation of said memory button, whereby desired program reserving data can be preset in said receiver.

* * * * *